D. W. MOSS & C. E. OLSCHNER.
TRAIN PIPE COUPLING.
APPLICATION FILED JUNE 10, 1910.
988,206.
Patented Mar. 28, 1911.
2 SHEETS—SHEET 1.
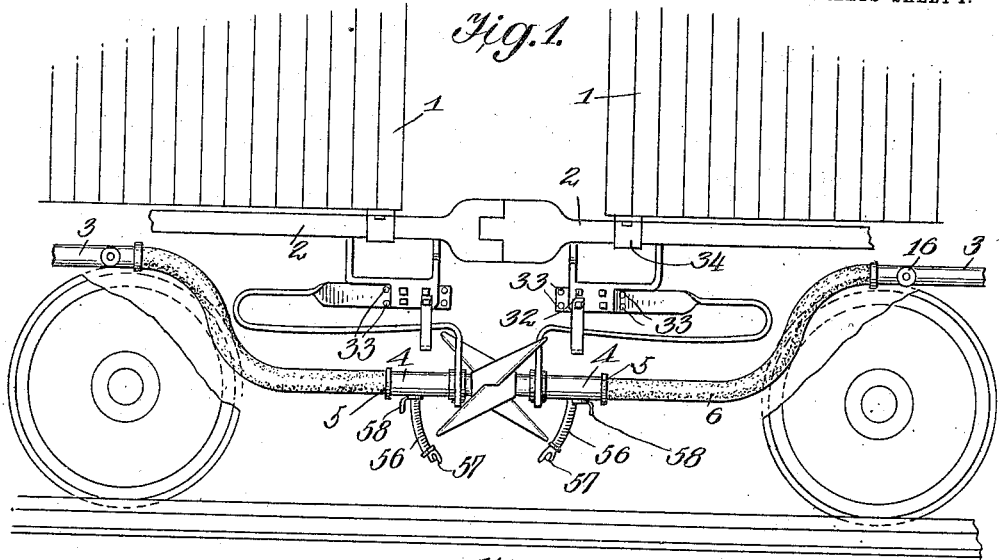
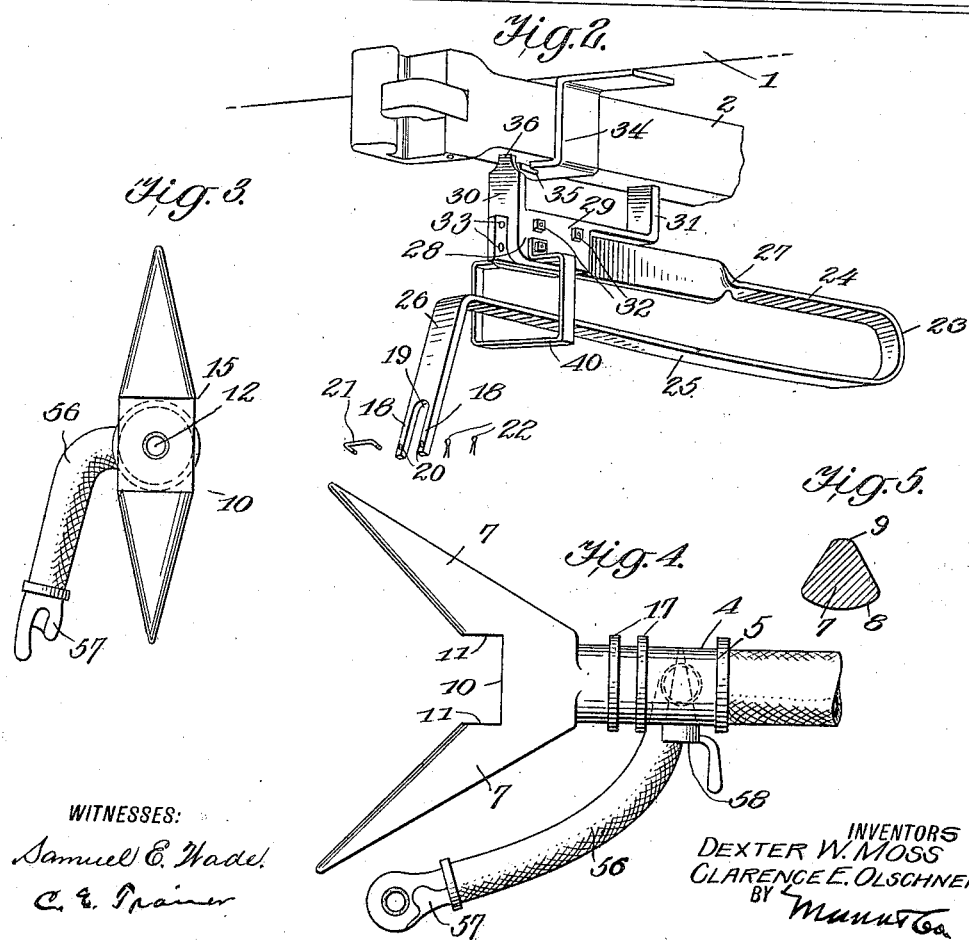
WITNESSES:
Samuel E. Wade
C. E. Trainer
INVENTORS
DEXTER W. MOSS
CLARENCE E. OLSCHNER
BY Munn & Co.
ATTORNEYS D. W. MOSS & C. E. OLSCHNER.
TRAIN PIPE COUPLING.
APPLICATION FILED JUNE 10, 1910.
988,206.
Patented Mar. 28, 1911.
2 SHEETS—SHEET 2.
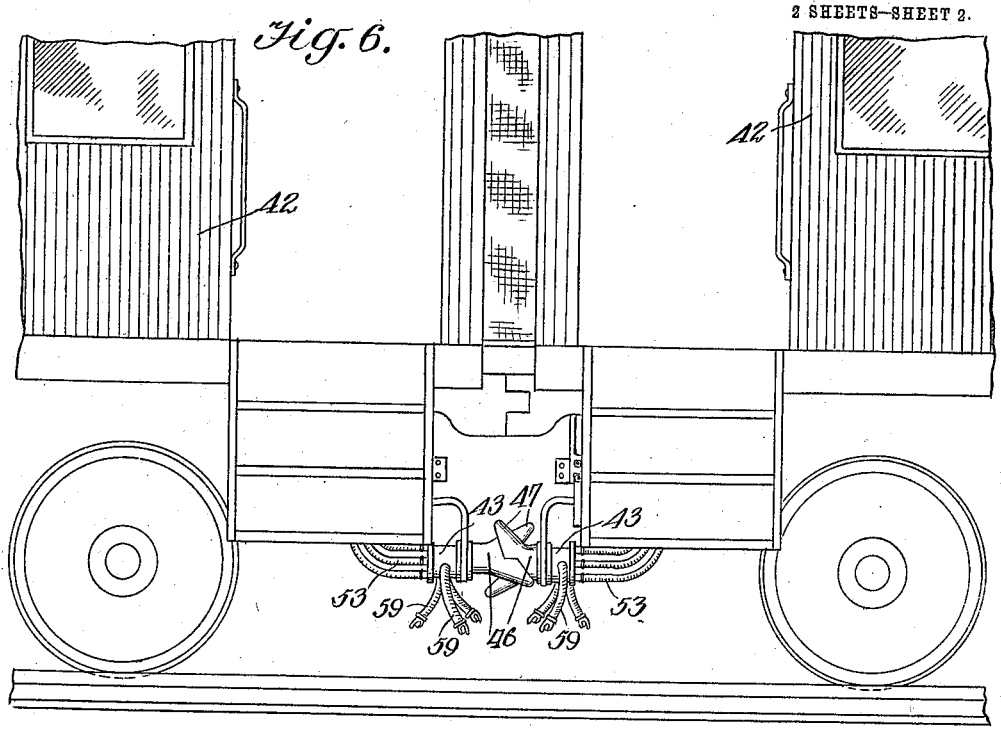
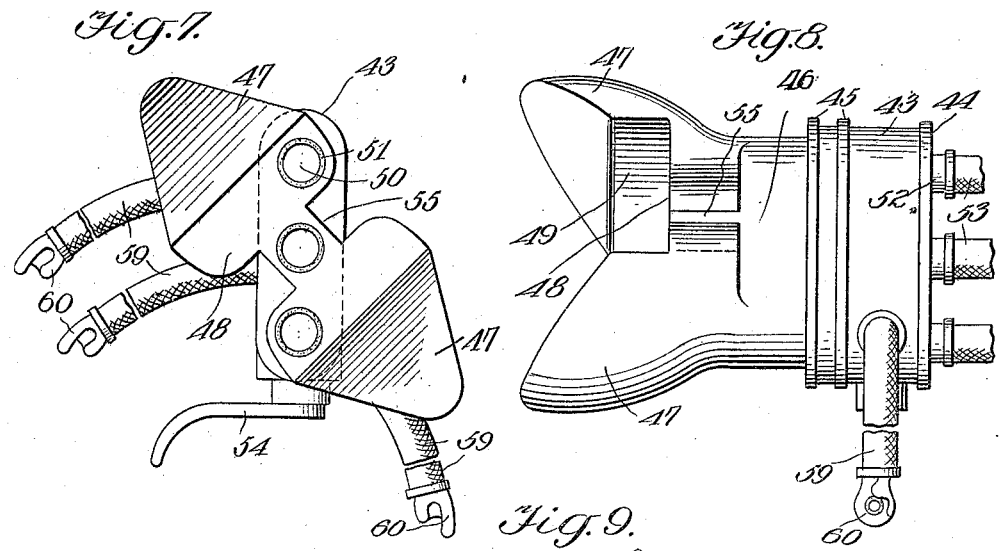
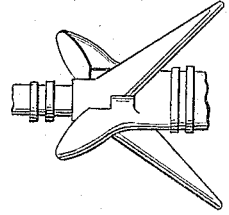
WITNESSES:
Samuel E. Wade
C. E. Trainer
INVENTORS
DEXTER W. MOSS
CLARENCE E. OLSCHNER
BY
ATTORNEYS

UNITED STATES PATENT OFFICE.

DEXTER W. MOSS AND CLARENCE E. OLSCHNER, OF BEAUMONT, TEXAS.

TRAIN-PIPE COUPLING.

988,206.

Specification of Letters Patent. Patented Mar. 28, 1911.

Application filed June 10, 1910. Serial No. 566,135.

*To all whom it may concern:*

Be it known that we, DEXTER W. Moss and CLARENCE E. OLSCHNER, citizens of the United States, and residents of Beaumont, in the county of Jefferson and State of Texas, have made certain new and useful Improvements in Train-Pipe Couplings, of which the following is a specification.

Our invention is an improvement in train pipe couplings, and consists in certain novel constructions, and combinations of parts, hereinafter described and claimed.

The object of the invention is to provide a simple coupling of the character specified, by means of which the pipes may be expeditiously coupled and uncoupled, and which will make a tight and secure joint, that will be unaffected by the relative displacement of the cars with respect to each other incident to ordinary travel.

Referring to the drawings forming a part hereof, Figure 1 is a side view of the coupling in place, Fig. 2 is a perspective view of a draw bar and the support for the coupling, Fig. 3 is a nend view of the coupling looking at the coupling face thereof, Fig. 4 is a side view, Fig. 5 is a transverse section of one of the arms, Fig. 6 is a view similar to Fig. 1, showing the coupling for passenger cars, Fig. 7 is a face view of one section, Fig. 8 is a side view of the same, and Fig. 9 is a reduced side view of a freight and a passenger section connected.

The embodiment of the invention shown in Figs. 1 to 5, is shown in place on a car 1, and is supported from the draw bar 2 thereof, and the said draw bar may be of any approved automatic type. The train pipe 3 is supported beneath the body of the car in the usual manner, and the said pipe transmits the air from the locomotive to the end of the train.

Each coupling consists of two similar sections, one of which is supported on each car, and only one will be described. Each section (Fig. 4) consists of a hollow cylindrical body 4, having at one end a coupling 5, for the attachment of the flexible pipe or hose 6, leading from the train pipe to the section. At the other end each section is provided with a pair of diverging horns or arms 7, each of which is shaped in cross sections as shown in Fig. 5, being substantially triangular, and arranged with the base of the triangle inward. The inner face 8 of the horn is slightly rounded from side to side, and the apex 9 is also rounded and blunt.

Below the arms is a recess 10 having a flat bottom, and perpendicular side walls 11, and the bottom of the recesses of the two sections fit against each other when the sections are coupled. The body 4 of the coupler is provided with a longitudinal passage 12, opening on to the face, and encircled by a gasket 15 of rubber or other suitable material.

It will be understood that the passage 12 connects with the hose in the usual manner, so that when the sections are coupled the train pipe becomes practically continuous, and the train pipe is provided with the usual valve 16 adjacent to the hose, so that the said pipe may be closed when desired.

Each of the coupler sections is provided on its body portion near the arms 7 with a pair of spaced annular ribs 17, forming a groove between them, and a pair of spaced, substantially parallel arms 18 on a plate to be described engages the groove. The end of the plate between the arms is rounded at 19 to fit the body portion, and each arm is provided at its end with an opening 20.

The arms of a yoke 21 extend through the openings, and are engaged by pins 22, the arms passing beneath the body portion of the section, and holding the said body in place. Each of the plates is formed of resilient material, and is doubled upon itself at 23, to form a pair of substantially parallel arms 24 and 25.

The arm 25 is provided at the end adjacent to the coupler section, with an angular depending portion 26, which carries the arms 18 before mentioned. The arm 24 intermediate its ends is given a quarter turn as shown at 27, and the outer end thereof is received between a pair of spaced lugs 28, on the body 29 of a substantially U-shaped bar, whose arms 30 and 31 are connected to the end of the draw bar 2.

A plurality of bolts 32 extend through the lugs 28 and the arm 24 for securing the plate in place, and the said arm is provided with a plurality of openings 33 for receiving the bolts, so that the said plate may be adjusted longitudinally of the draw bar to some extent. In the drawings, four bolts are shown, and the arm of the plate is provided with an additional pair of openings on each side of the lugs, so that the plate may take either of three positions.

The draw bars 2 are slidable longitudinally of the car in the usual manner, being supported in hangers 34, and the arms 30 and 31 of the U-shaped bar are arranged on each side of one of the hangers, but spaced apart therefrom. The draw bar is spring supported in the usual manner, and the outer edge of the hanger is cut away to form a notch at 35, to receive the end of the arm 30, which is also cut away on each side at 36 adjacent to its connection with the draw bar, to fit the notch (Fig. 2).

The coupling sections are held frictionally between the arms 18, but not so tightly that they cannot turn, and the arms 7 of the sections extend outwardly from the body at an angle of approximately 45°. Whatever the position occupied by the sections with respect to each other, when the cars are moved together, the engagement of the arms of one section with the arms of the other section will turn the sections so that the bottoms 10 of the recesses will fit squarely against each other.

The flexible pipes 6 will hold the sections in proper position for coupling, and the arms 18 may be clamped more or less tightly on the body portion of the section by means of the yoke 21 and pins 22. It will be observed, that by arranging the plate supporting the sections as shown, the sections are resilient in every direction.

Inward movement longitudinally of the car is permitted by the angular portion 26, downward movement by the bend at 23, and lateral movement by the quarter turn at 27. Downward and backward and upward and backward movement is permitted by the combined action of the angular portion 26 and the bend 23. Thus a single plate is utilized for the work of at least three springs.

The movement of the portion 25 of the plate is limited by a loop 40, secured to the lugs 28 of the bracket 29, on one of the bolts 32, the said loop inclosing the portion 25, but permitting it to move freely within limits.

In the embodiment shown in Figs. 6 to 9, the cars 42 are provided at each end with a coupling section shown in Figs. 7 and 8, and comprising a body 43 provided at one end with an annular rib 44, and at the other with a pair of spaced ribs 45, forming a groove therebetween for engagement by the arms 18 of the plate shown in Fig. 2.

The body 43 is oblong or substantially elliptical in cross section, and is extended beyond the ribs 45 as at 46, and is then bifurcated to form two diverging forks or arms 47, somewhat similar to the arms 7, but shorter and heavier. Between the arms is a face 48 having vertical side walls 49, and three openings 50 open onto the face, each being encircled by a gasket 51.

The openings are arranged diagonally, and each opening is the end of a passage extending through the body 43, and opening at the opposite side by a nipple 52, to which may be connected the usual hose 53. The three openings are for the air, steam and signal pipes respectively, and the openings of one section register with the openings of the other section when the sections are locked together.

A valve is provided for closing the train pipe when the sections are uncoupled, and the sections are supported in the same manner as are the sections for the freight cars. Each passenger coupling section is provided at opposite sides of the face 48 with a longitudinal groove 55, which permits the section to be coupled with a freight coupling section as shown in Fig. 9.

The groove receives the walls 11 of the face 10 and causes the opening 12 of the freight coupling section to register with the central opening 50 of the passenger coupling section, the said opening being the air pipe opening. By means of the groove freight cars may be coupled onto passenger cars, with no changes whatever. Means is also provided for connecting cars provided with the improved coupler sections with cars not so provided, either freight or passenger, the said means consisting of a hose section 56 leading from the coupler body 4 and provided at its outer end with the ordinary coupler section 57. A three way valve 58 is provided in the body for connecting the hose 6 with either the opening 12, or the hose 56.

In the embodiment shown in Figs. 6, 7 and 8, three hose sections 59 are shown connected with the body 43, and communicating each with one of the passages opening at 50. The valve 54 is provided with means for simultaneously connecting the three hose 53 with the three passages opening at 50, or with the hose section 59, and each hose 59 is provided with the ordinary coupler section 60.

It will be evident that the sections for freight and passenger cars are practically the same, the slight changes being necessary on account of the different conditions, and the operation is precisely the same with both forms.

We claim—

1. A coupler of the character specified, comprising opposing sections, each comprising a body provided at one end with a coupling and at the other end with forwardly and outwardly diverging arms, the body having a plane coupling surface between the arms for engaging the corresponding surface of the other section, said coupler having a plurality of longitudinal passages opening onto the coupling surface, and a gasket encircling each opening, and means for connecting the sections with a car, said means comprising a resilient plate doubled upon itself to form substantially parallel arms, one arm having at its outer end an angular portion extending downwardly and forwardly, and provided at its extremity with a pair of spaced arms each having at its end a bearing, the body of the section having an annular groove for engagement by the arms, a bolt traversing the bearings, the other arm of the plate being given a quarter turn intermediate its ends, a substantially U-shaped bar having its body portion provided with spaced lugs between which the last named arm of the plate is secured, the arms of the bar being adapted for attachment to a draw bar.

2. A coupler of the character specified, comprising opposing sections, each comprising a body provided at one end with a coupling and at the other end with forwardly and outwardly diverging arms, the body having a plane coupling surface between the arms for engaging the corresponding surface of the other section, said coupler having a plurality of longitudinal passages opening onto the coupling surface, and a gasket encircling each opening, and means for connecting the sections with a car, said means comprising a plate of resilient material doubled upon itself, and provided at one end with an angular outwardly extending portion having spaced arms encircling the body of the section and detachably connected therewith, said plate being given a quarter turn adjacent to its opposite end, and means for connecting the said end to the draw bar of a car.

3. A coupler of the character specified, comprising opposing sections, each comprising a body provided at one end with a coupling and at the other end with forwardly and outwardly diverging arms, the body having a plane coupling surface between the arms for engaging the corresponding surface of the other section, said coupler having a plurality of longitudinal passages opening onto the coupling surface, and a gasket encircling each opening, and means for connecting the section with a car, said means comprising a resilient plate doubled upon itself, and having at one end an angular portion detachably connected with the section, said bar being given a quarter turn near its other end, and means for detachably connecting the said other end with the draw bar of a car.

4. A coupler of the character specified, comprising opposing sections, each comprising a body provided at one end with a coupling and at the other end with forwardly and outwardly diverging arms, the body having a plane coupling surface between the arms for engaging the corresponding surface of the other section, said coupler having a plurality of longitudinal passages opening onto the coupling surface, and a gasket encircling each opening, and means for connecting the section with a car, said means comprising a plate of resilient material doubled upon itself, and having at one end means for detachably engaging a section, and means for detachably connecting the other end with a draw bar.

5. A coupler of the character specified, comprising opposing sections, each comprising a body provided at one end with a coupling and at the other end with forwardly and outwardly diverging arms, the body having a plane coupling surface between the arms engaging the corresponding surface of the other section, said coupler having a plurality of longitudinal passages opening onto the coupling surface, and means for connecting the section with a car, said means comprising a plate of resilient material doubled upon itself, and having at one end means for detachably engaging a section, and means for detachably connecting the other end with a draw bar.

6. A coupler of the character specified, comprising a plurality of sections, each having an annular groove intermediate its ends, and means for mounting the coupler, said means comprising a plate of resilient material doubled upon itself and having at one end an outwardly extending lateral portion having spaced arms for engaging the groove, said plate being given a quarter turn near its other end, and means for connecting the said end to a draw bar.

7. A coupler of the character specified, comprising a plurality of similar sections, and means for connecting the sections to a draw bar, said means comprising a resilient plate doubled upon itself on its widest dimension to form a pair of arms, one of the arms being bent laterally away from the other arm and having means for engaging the section near its end, the other arm being twisted upon itself intermediate its ends to present the widest dimension at right angles, and a substantially U-shaped bar having spaced lugs on its body portion to receive the last named end, the arms thereof engaging the draw bar, and means for adjustably securing the lugs to the end of the plate.

8. A coupler of the character specified, comprising a plurality of similar sections, and means for connecting the sections to a draw bar, said means comprising a resilient plate doubled upon itself on its widest dimension to form a pair of arms, one of the arms being bent laterally away from the other arm and having means for engaging the section near its end, and the other one being twisted upon itself intermediate its ends to present the widest dimension at right angles.

9. A coupler comprising similar sections, each section consisting of a body portion having at one end a coupling for the train pipe connection, and at the other a pair of diverging arms, the section having a plane surface between the arms for contacting with the corresponding surface of the other section, and having a plurality of longitudinal passages opening onto the plane surface, said body having a longitudinal groove at each side of the plane surface for the purpose specified.

10. A coupler comprising similar sections, each section comprising a body having at one end means for connecting it with the train pipe, and at the other a plane surface for contacting with the corresponding surface of the other sections and having a pair of arms, the said arms being on opposite sides of the surface and diverging from each other, and a longitudinal passage opening onto the said surface, said body having a longitudinal groove at each side of the plane surface for the purpose specified.

11. A coupler of the character specified, comprising similar sections, each section consisting of a body portion having at one end a coupling for the train pipe connection and at the other a pair of diverging arms, the section having a plane surface between the arms for contacting with the corresponding surface of the other section, and having a longitudinal passage opening on to the plane surface, said body having a longitudinal groove at each side of the plane surface and between the arms for the purpose specified.

DEXTER W. MOSS.
CLARENCE E. OLSCHNER.

Witnesses:
J. D. CAMPBELL,
M. C. DEATON.

Copies of this patent may be obtained for five cents each, by addressing the "Commissioner of Patents, Washington, D. C."